United States Patent
Lee et al.

(10) Patent No.: US 9,965,662 B2
(45) Date of Patent: May 8, 2018

(54) PATTERN RECOGNITION BASED MOTION DETECTION FOR ASSET TRACKING SYSTEM

(71) Applicant: Chep Technology PTY Limited, Sydney OT NSW (AU)

(72) Inventors: Brian Lee, Boston, MA (US); Mrinmoy Chakraborty, Bangalore (IN); Jamshed Dubash, Shrewsbury, MA (US); Jahangir Nakra, Titusville, NJ (US)

(73) Assignee: Chep Technology PTY Limited, Sydney (AU)

( * ) Notice: Subject to any disclaimer, the term of this patent is extended or adjusted under 35 U.S.C. 154(b) by 0 days. days.

(21) Appl. No.: 15/439,664

(22) Filed: Feb. 22, 2017

(65) Prior Publication Data

US 2017/0372103 A1 Dec. 28, 2017

Related U.S. Application Data

(63) Continuation of application No. 14/038,341, filed on Sep. 26, 2013, now Pat. No. 9,613,239.

(Continued)

(51) Int. Cl.

| | |
|---|---|
| *G06K 7/10* | (2006.01) |
| *G08B 1/08* | (2006.01) |
| *G06Q 10/08* | (2012.01) |
| *G06Q 10/06* | (2012.01) |
| *A61B 5/103* | (2006.01) |
| *B60R 25/10* | (2013.01) |

(Continued)

(52) U.S. Cl.
CPC ......... *G06K 7/10366* (2013.01); *G06Q 10/06* (2013.01); *G06Q 10/08* (2013.01); *G06Q 50/28* (2013.01); *G01S 5/0027* (2013.01)

(58) Field of Classification Search
CPC .. G06K 7/10366; G06Q 10/08; G01S 5/0027; G08B 1/08; B60R 25/10; G01C 21/26; A61B 5/103
USPC .......... 340/10.1–10.5, 426.12, 427; 701/502, 701/472
See application file for complete search history.

(56) References Cited

U.S. PATENT DOCUMENTS

| | | |
|---|---|---|
| 5,438,607 A | 8/1995 | Przygoda, Jr. et al. |
| 5,491,486 A | 2/1996 | Welles, II et al. |

(Continued)

OTHER PUBLICATIONS

Notice of Allowance dated Nov. 17, 2016 for U.S. Appl. No. 14/038,341, filed Sep. 26, 2013, 9 pages.

(Continued)

*Primary Examiner* — Nam V Nguyen
(74) *Attorney, Agent, or Firm* — Kilpatrick Townsend & Stockton LLP

(57) ABSTRACT

An asset tracking system that optimizes the value per ping by tying the ping to a pattern of movements of the asset. The asset tracking device will send a ping to a remote host (i.e., receiver) when predetermined qualified event is detected by the device. In such a manner, the value per ping is optimized, leading to increased battery life and decreased operational cost. To satisfy these conditions, the asset tracking device is equipped with appropriate sensors, actuators, and trigger mechanism(s). A four-phase methodology or algorithm used to detect and determine when detected motions and movements warrant triggering the data ping.

20 Claims, 6 Drawing Sheets

Related U.S. Application Data

(60) Provisional application No. 61/706,374, filed on Sep. 27, 2012.

(51) Int. Cl.
  *G06Q 50/28* (2012.01)
  *G01S 5/00* (2006.01)

(56) References Cited

U.S. PATENT DOCUMENTS

| | | | |
|---|---|---|---|
| 5,844,482 A | 12/1998 | Guthrie et al. | |
| 6,373,389 B1 | 4/2002 | Przygoda, Jr. et al. | |
| 6,415,223 B1 | 7/2002 | Lin et al. | |
| 6,700,533 B1 | 3/2004 | Werb et al. | |
| 6,717,517 B2 | 4/2004 | Przygoda, Jr. | |
| 6,934,625 B2 | 8/2005 | Haddad | |
| 7,026,937 B2 | 4/2006 | Przygoda, Jr. | |
| 7,034,683 B2 | 4/2006 | Ghazarian | |
| 7,100,052 B2 | 8/2006 | Ghazarian | |
| 7,133,704 B2 | 11/2006 | Twitchell, Jr. | |
| 7,155,264 B2 | 12/2006 | Twitchell, Jr. | |
| 7,173,529 B2 | 2/2007 | Przygoda, Jr. | |
| 7,209,771 B2 | 4/2007 | Twitchell, Jr. | |
| 7,242,306 B2 | 7/2007 | Wildman et al. | |
| 7,252,230 B1 | 8/2007 | Sheikh et al. | |
| 7,313,476 B2 | 12/2007 | Nichols et al. | |
| 7,336,182 B1 | 2/2008 | Baranowski et al. | |
| 7,365,737 B2 * | 4/2008 | Marvit | G06F 3/017 345/156 |
| 7,398,153 B2 | 7/2008 | Workman et al. | |
| 7,400,259 B2 * | 7/2008 | O'Connor | A61B 5/6828 340/539.12 |
| 7,443,297 B1 | 10/2008 | Baranowksi et al. | |
| 7,446,658 B2 | 11/2008 | Panotopoulus | |
| 7,564,357 B2 | 7/2009 | Baranowski et al. | |
| 7,633,389 B2 | 12/2009 | Montovani et al. | |
| 7,656,278 B2 | 2/2010 | Onishi et al. | |
| 7,668,596 B2 | 2/2010 | Von Arx et al. | |
| 7,783,423 B2 | 8/2010 | Verma et al. | |
| 7,903,084 B2 * | 3/2011 | Marvit | G06F 3/0346 345/156 |
| 7,956,746 B2 | 6/2011 | Truscott et al. | |
| 8,036,826 B2 | 10/2011 | MacIntosh et al. | |
| 8,095,070 B2 | 1/2012 | Twitchell, Jr. | |
| RE43,178 E | 2/2012 | Ghazarian | |
| 8,111,157 B2 | 2/2012 | Diener et al. | |
| 8,159,338 B2 | 4/2012 | Breed | |
| 8,204,439 B2 | 6/2012 | Twitchell, Jr. | |
| 8,248,242 B2 | 8/2012 | Caliri et al. | |
| 8,514,058 B2 | 8/2013 | Cameron | |
| 8,630,768 B2 | 1/2014 | McClellan et al. | |
| 8,692,764 B2 * | 4/2014 | Marvit | G06F 1/1613 345/156 |
| 8,694,251 B2 | 4/2014 | Janardhanan | |
| 9,504,414 B2 * | 11/2016 | Coza | G06F 3/011 |
| 9,613,239 B2 * | 4/2017 | Lee | G06Q 10/06 |
| 2007/0091292 A1 | 4/2007 | Cho et al. | |
| 2012/0232430 A1 | 9/2012 | Boissy et al. | |
| 2013/0041290 A1 | 2/2013 | Kording et al. | |
| 2013/0041617 A1 | 2/2013 | Pease et al. | |

OTHER PUBLICATIONS

Final Office Action dated Apr. 29, 2016 for U.S. Appl. No. 14/038,341, filed Sep. 26, 2013, 11 pages.
Non-final Office Action dated Oct. 2, 2015 for U.S. Appl. No. 10/038,341, filed Sep. 26, 2012, 15 pages.
U.S. Appl. No. 13/796,683 (Lee et al.) filed Mar. 12, 2013.
U.S. Appl. No. 13/796,574 (Chakraborty et al.) filed Mar. 12, 2013.
U.S. Appl. No. 13/845,802 (Lee et al.) filed Mar. 18, 2013.

* cited by examiner

PATTERN RECOGNITION BASED MOTION DETECTION FOR ASSET TRACKING SYSTEM

CROSS-REFERENCE TO RELATED APPLICATION

This application is a continuation of Ser. No. 14/038,341 filed Sep. 26, 2013, which claims the benefit of U.S. Provisional Application No. 61/706,374 filed Sep. 27, 2012, the entire contents of which are incorporated herein by reference for all purposes.

FIELD OF THE DISCLOSURE

The present disclosure relates generally to asset tracking devices and systems. Based on the movement and relation of the assets or items in the environment, the system of the disclosure locates the assets in the environment through the use of wireless communication tracking devices.

BACKGROUND

In industry nowadays, success or failure depends in part upon knowing the up-to-date status of various assets. For example, in the freight delivery business, up-to-date knowledge of the location and, in some instances, the environment of various assets, such as pallet goods, is critical to efficient and reliable operations. Failure to maintain up-to-date status information can result in temporarily lost assets, sub-optimal use of the assets, and in the case of freight delivery, missed or late deliveries.

Recently, technologies have been developed that greatly assist in tracking locations of assets. For example, global positioning systems (GPS) use wireless signals transmitted by earth-orbiting satellites to calculate the position of a receiving device. Although relatively expensive, GPS receivers are capable of providing relatively accurate location information for virtually any point in the world.

More recently, radio frequency identification (RF or RFID) systems have been developed in which devices, often referred to as "tags," wirelessly communicate with readers. RF tracking systems are typically used in parcel tracking and sorting, container tracking, luggage tracking, retail tracking, warehouse tracking and inventory operations. The RF tags may be either passive or active. Passive tags absorb signals transmitted by the reader and retransmit their own signals, such as identification information. While passive tags do not require a local power source, their resulting transmit range is relatively short, typically less than 5-10 meters. In contrast, active tags, which send a signal to indicate its location, include a local energy source (such as a battery) that improves transmission range. Depending on the wireless signal system used by the device, the range may be on the order of several meters or several hundred meters. Regardless of the types of tags used, knowledge of the fixed location of the reader devices allows users to identify the location of assets that have tags attached thereto.

Active tag systems are preferred for some applications due to their long range transmission range. Unfortunately, the position signal or "ping" drains battery life of the transmitter, thus resulting in added operational cost of the system.

Obtaining increased system value and decreased operational cost are key business and technical goals for designers of tracking systems. Increasing the value per ping, by decreasing the cost per ping, is one mechanism to decrease the operational cost of active systems. In an exception based asset management environment, the value per ping is the lowest under normal conditions. Merely increasing the period between subsequent pings, however, although it may decrease the cost per ping, does not intelligently decrease the cost per ping, as the extended period may miss critical movement of the tagged asset.

SUMMARY

The value per ping is highest when the ping captures a business critical event in the field. The present disclosure provides an active RF tracking system in Which the value per ping is increased (preferably optimized) by adjusting the ping rate under different conditions. In this disclosure, the ping rate, ping occurrence, and ping period is based on detected pre-selected motion of the tagged asset.

The present disclosure provides a method and apparatus for optimizing value per ping for an asset tracking device by tying the ping occurrence to a predetermined motion of the asset. The asset tracking device will send a ping to a remote host (i.e., receiver or cellular communication tower) when pre-determined condition(s) regarding the motion are met, conditions such as time between movements, the pattern of movement, and number of movements within a time period. In such a manner, the value per ping is optimized, leading to increased battery life and decreased operational cost. To satisfy these conditions and exception events, the asset tracking device is equipped with appropriate sensors, actuators, and trigger mechanism(s). The sensors and actuators detect movements and confirm or recognize a sequence of movements. When the detected movements and sequence of movements match a predetermined, recognized pattern or condition, the trigger mechanism is activated, after which a data ping is sent.

The present disclosure is directed to a methodology or algorithm used to detect and determine when detected motions warrant triggering the data ping.

In one particular embodiment, this disclosure provides a method of tracking an asset with a wireless RF system comprising a transmitter and a receiver, the transmitter having a motion sensor. The method comprises sending a data ping from the transmitter to the receiver when a qualified event, based on a plurality of motions, has been identified by a pattern recognition methodology comprising (1) a discretization phase, (2) a parameterization phase, (3) a motion detection phase, and (4) a scripting phase. In the discretization phase, the plurality of movements are detected by the motion sensor and data from the motion sensor are combined to create a composite movement. In the parameterization phase, magnitude and duration of the composite movements are parameterized. In the motion detection phase, the data from the movements is analyzed in relation to a predetermined threshold to determine if a movement has occurred. In the scripting phase, the movements are combined to create an action of interest. From this action of interest, qualified events are identified and sending of a data ping is triggered.

In another particular embodiment, this disclosure provides a wireless RF tracking system comprising a transmitter and a receiver. The transmitter includes a motion sensor and an RF communication module and is configured to send a data ping to the receiver when a qualified event, based on a plurality of motions, has been identified by a pattern recognition methodology. The pattern recognition methodology includes (1) a discretization phase Where the plurality of movements are detected by the motion sensor and data from the motion sensor are combined to create a composite movement, (2) a parameterization phase where magnitude and duration of the composite movement are parameterized, (3) a motion detection phase where the data from the movements is analyzed in relation to a predetermined threshold to determine if a movement has occurred, and (4) a scripting phase where the movements are combined to create an action of interest.

In yet another particular embodiment, this disclosure provides a wireless RF tracking system comprising a transmitter and a receiver, the transmitter having a motion sensor, an RF communication module and a processor. The system has an algorithm configured to send a data ping from the transmitter to the receiver, the algorithm being a smart ping algorithm including both event-based ping methodology and time-based ping methodology.

Disadvantages of prior wireless data fetching systems (e.g., tracking systems) include having non-value added pings, which thus cause faster battery drainage, and having timed or scheduled pings unrelated to practical events (e.g., business logic or exception events), which thus reduce the value per ping. The system of the present disclosure increases value per ping, provides a longer battery life for the battery-powered tracking device, and decreases operational cost, particularly battery maintenance cost.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DISCUSSION OF THE INVENTION

Figure 1:
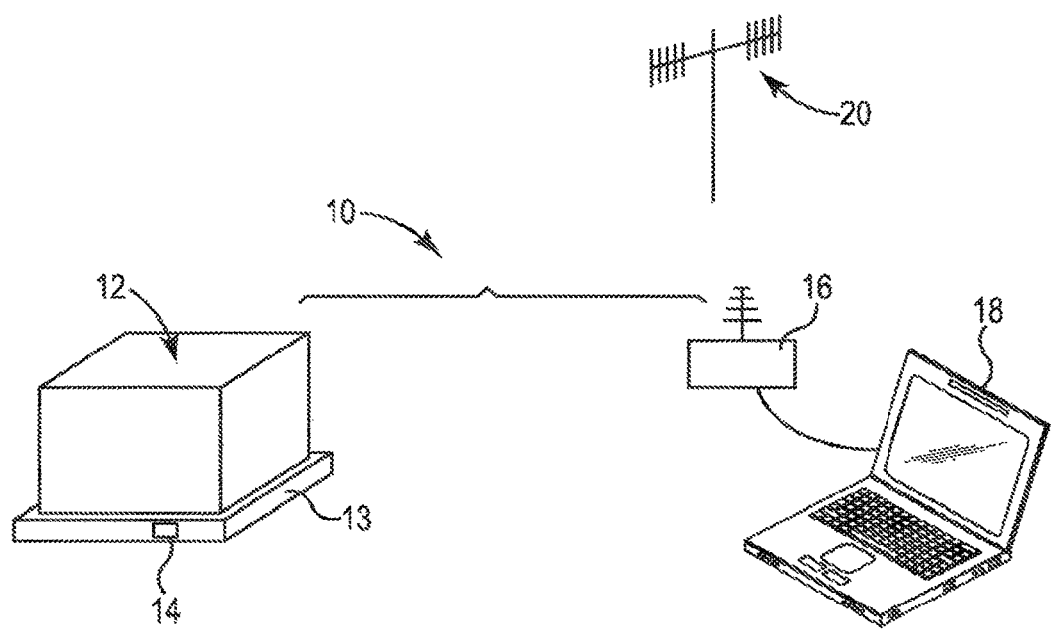
FIG. 1 is a perspective view of components of a tracking system according to this disclosure.

Assets and products (e.g., items, objects or people) move through different paths, such as manufacturing processes and supply chains during the course of their lifetime. There is a desire to track these assets, in some embodiments, because of their value or, in other embodiments, for business justification purposes. A tracking device or system therefore is highly beneficial for solving the dilemma of knowing the physical location of the asset at a set point in time.

The present disclosure is directed to a wireless, active, RF tracking system that increases value per ping, provides a longer battery life of the battery-powered device, and decreases operational cost, particularly battery maintenance cost. Disadvantages of prior wireless data fetching systems include having non-value added pings (thus causing faster battery drainage), and having timed or scheduled pings unrelated to business logic or exception events, thus reducing the value per ping.

The present disclosure provides an asset tracking device that uses an optimized communication protocol. The asset tracking device will send a data ping, identifying the tracking device's location, to a remote host (receiver) when predetermined "motion signatures" are met. A "motion signature' is a set or sequence of movements, that when combined, qualify as a unique business event, such as loading of the asset onto a transportation vessel, unloading, etc. Here, the ping occurrence is coupled to a recognized pattern of motion, such as the loading or unloading event. Any other recognized pattern of motion (such as one unrelated to the business event) or any unrecognized motion that does not match a motion signature will not trigger the ping. With such a protocol, the value per ping is increased and preferably maximized. This leads to optimal usage of battery life and decreased operational cost.

The tracking system includes a transmitter device configured for attachment to the item to be tracked and a receiver device. In addition to the various components for sending its position data to the receiver, the transmitter includes a motion sensor for detecting movement of the device. Although the term "motion sensor" is used herein, it is to be understood that multiple sensors may be used to detect and/or recognize the motion. The tracking system also includes a motion recognition algorithm and trigger mechanism. The motion recognition algorithm automatically processes, analyzes and recognizes the detected motions, and searches for similarity to a predetermined, recognized pattern of motion. When the motions match the recognized pattern, the trigger mechanism is activated.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The tracking devices and systems of this disclosure utilize an intelligent, active ping to increase the value per ping from the transmitter and provide a longer battery life for the battery-powered transmitter. The system utilizes a motion-based or movement-based ping in which the ping occurrence is adjusted based on predetermined events, specifically, the expected occurrence of an event (a business event) and/or physical movement or motion of the device. In some embodiments, the system combines the motion-based ping with a time-based pin. The system has lower operational cost, particularly battery maintenance cost, than conventional active ping systems that have a set ping rate or a random ping rate.

FIG. 1 illustrates a system 10 of the present disclosure. System 10 includes an asset 12 on which is located a transmitter device 14. Transmitter device 14 is an active RF tag, having the capability to actively transmit and/or provide interactive information to a receiver 16, located remote from asset 12 and transmitter device 14. Receiver 16 is operably connected to a computer or display 18. System 10 uses an established wireless communication network 20 to identify the location of transmitter device 14 and convey that information to display 18. Examples of wireless RF communication networks 20 with which system 10 can function include CDMA/GMS, ZigBee, (Low Energy) BlueTooth (LBT), WiFi (sometimes referred to as WLAN), LTE, and WiMax.

Transmitter device 14 is secured to asset 12, for example, on pallet 13 on which is loaded goods; in some embodiments, device 14 may be secured to pallet 13 in a manner that does not readily allow removal of device 14 from pallet 13. In some embodiments, transmitter device 14 is embedded into pallet 13, for example, in the center of pallet 13 under its top surface, whereas in other embodiments transmitter device 14 is adhered to pallet 13. Alternately, transmitter device 14 is removably secured to asset 12, for example, on the goods present on pallet 13. In such embodiments, device 14 is preferably on the top surface or on a surface close to the highest point of asset 12. Device 14 is preferably positioned on asset 12 so that no operators, animals, equipment, etc. can access transmitter device 14 during normal movement of asset 12 and remove, damage or otherwise hinder the operation of device 14. Preferably, transmitter device 14 is independently powered and electrically isolated from asset 12 and does not require manual intervention during normal operation of the tracking system 10.

Figure 2A:
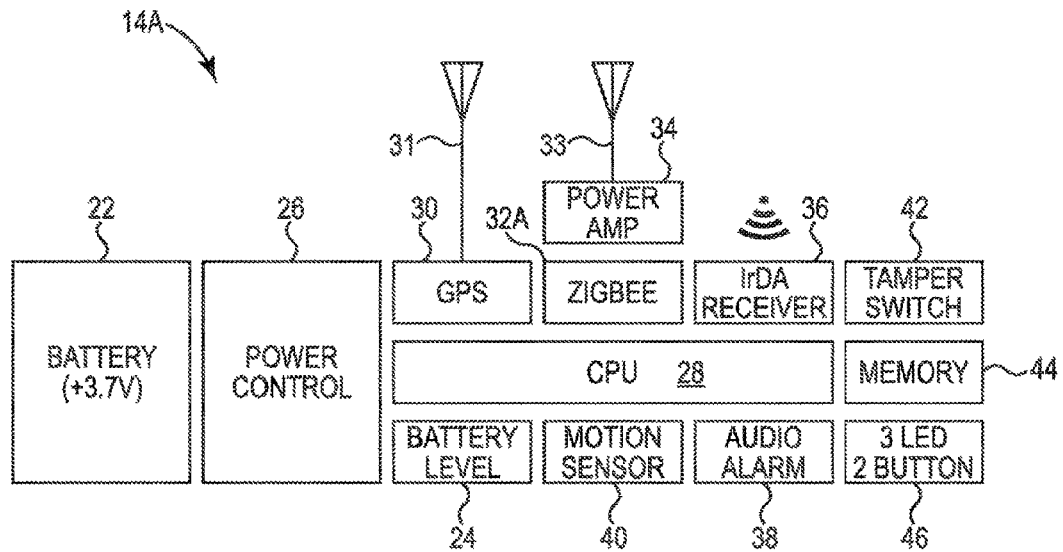
FIG. 2A is a schematic block diagram of a tracking device according to this disclosure.
Figure 2B:
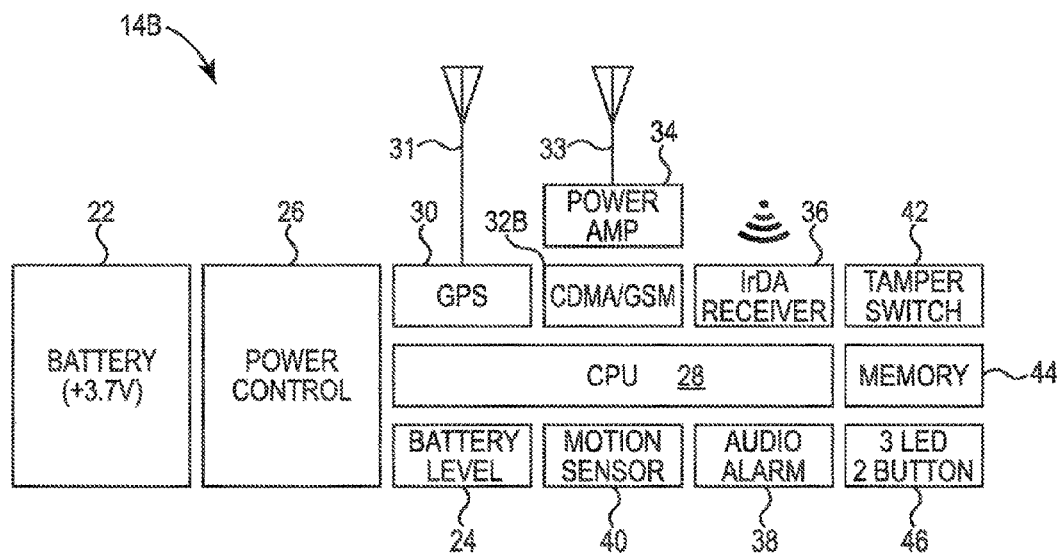
FIG. 2B is a schematic block diagram of an alternate tracking device according to this disclosure.

FIGS. 2A and 2B illustrate two embodiments of transmitter device 14, as transmitter device 14A and 14B respectively. Each embodiment includes a battery 22, which may be a single use battery or a rechargeable battery. Examples of suitable batteries include NiCad, lithium, lithium-ion, zinc-carbon, and alkaline batteries. In the figures, batteries 22 are identified as a 3.7V battery, although it is understood that other voltage batteries 22 could be used. Electrically connected to battery 22 is a battery level monitor 24 and a power control 26, which in turn is operably connected to a computer chip or CPU 28. Transmitter device 14 also includes a positioning element, in these embodiments a GPS positioning element 30 connected to an antenna 31, which may be an internal antenna or an external antenna. Positioning element 30 provides data to transmitter device 14A, 14B regarding its physical location. When device 14A, 14B transmits data (i.e., pings), this location can then be transmitted to display 18.

In some embodiments, transmitter device 14 has two-way communication with receiver 16. That is, transmitter device 14 transmits information and also receives information from receiver 16. Transmitter device 14 transmits information, such as location, to display 18. Further, transmitter device 14 receives instructions, such as to acknowledge that device 14 is active and ready and to transmit the location information. Having received those instructions, device 14 can send back to receiver 16 acknowledgement that the communication was received and acted on.

The two embodiments of FIGS. 2A and 2B differ only in that device 14A of FIG. 2A includes a ZigBee module 32A, configured to connect to receiver 16 via a ZigBee network 20 and communicate data to display 18, whereas device 14B of FIG. 2B includes a CDMA (Code Divisional Multiple Access) and/or GSM (Global System for Mobile Communication) module 32B, configured to connect to receiver 16 via either a CDMA or GSM network 20 and communicate data to display 18. Modules 32A, 32B each have an antenna 33, which may optionally include a power amplifier 34 to extend the range of the signal from module 32A, 32B. It is these modules 32A, 32B that provide the communication basis for transmitter device 14 to display 18. An alternate embodiment of a transmitter device can include both a ZigBee module 32A and a CDMA and/or GSM module 32B. In any of the embodiments, the ZigBee module and network may be a combined ZigBee/LBT module and its corresponding network.

Additionally, transmitter devices 14A, 14B may include a data receiver 36, such as an infra red data link (IrDA), to provide a second communication means to device 14A, 14B, as an alternate or back-up to module 32A, 32B. IrDA 36 includes an optical window formed from an IR transparent material, such as glass, to allow infra red radiation or energy to pass to and from IrDA 36. An audio alarm 38 may be included, to indicate any number of problems or malfunctions, such as low battery level, unauthorized movement (as sensed by motion sensor 40), or tampering with device 14A, 14B (as sensed by switch 42).

Any of the data or information regarding devices 14A, 14B, such as its position as determined by positioning element 30, alarm information, battery level information, and ping information, etc., can be stored in memory 44 of device 14A, 14B, which may be a permanent memory or a rewritable memory. Devices 14A, 14B also include various operational switches and buttons 46, in these embodiments, 3 LED lights and 2 button. The various elements that compose transmitter device 14A, 14B may be housed in an RF transmissive case, preferably one which is at least water resistant.

Figure 3A:
FIGS. 3A, 3B, 3C and 3D are schematic block diagrams of alternate motion sensors.
Figure 3B:
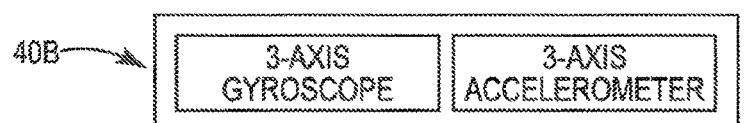
Figure 3C:
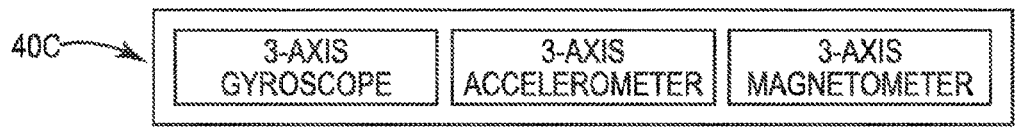
Figure 3D:
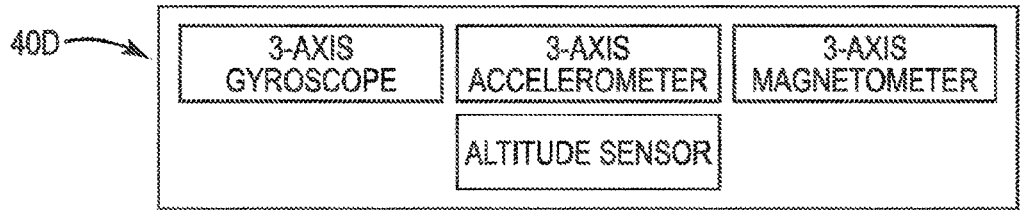

FIGS. 3A through 3D illustrate four embodiments of motion sensor 40. In FIG. 3A, motion sensor 40A is a three degree of freedom (DOF) device that has a 3-axis accelerometer. In FIG. 3B, motion sensor 40B is a six degree of freedom (DOE) device that includes a 3-axis gyroscope and a 3-axis accelerometer. In FIG. 3C, motion sensor 40C is a 9-DOF device that includes a 3-axis gyroscope, a 3-axis accelerometer and a 3-axis magnetometer. In FIG. 3D, motion sensor 40D includes a 3-axis gyroscope, 3-axis accelerometer, 3-axis magnetometer, and also an altitude sensor; this may be referred to as a 10-DOF device. Other embodiments of motion sensor 40 may be used. Motion sensor 40 (including any of motions sensors 40A, 40B, 40C, 40D) detects physical movement of device 14.

Often, asset 12 transported by a truck and loaded or unloaded by either hand-operated forklift or vehicle-operated forklift. The activities of loading (moving out) and unloading (moving in) asset 12 into warehouse are two business activities that are highly desired to be tracked. These business events are referred to herein as "qualified events". Pallet transportation (i.e., the transport between the loading and unloading events) and pallet repair activities or other down time are non-value added information, but desirous information nonetheless. These non-value information events are referred to herein as "unqualified events". Both qualified and unqualified events have a unique pattern of motions.

The pattern of motion for a loading event can have, for example, the following sequence of movements: a vertical movement up, a lateral movement, a turn movement, a lateral movement, and a vertical movement down. The pattern of motion for an unloading event can have the following sequence of movements: horizontal movement, a turn movement, a vertical movement up, another turn movement, a lateral movement, and a vertical movement down. It is understood that depending on the particular location, transport equipment and logistics, that a different sequence of movements may represent an unloading or a loading event. For example, space constraints may dictate additional lateral or turning movements. These patterns of motions are identified by the system of the present invention as a business event, the occurrence of which is used to adjust the ping rate and ping occurrence of transmitter device 14.

The motion or pattern recognition methodology can be broken down into four distinct phases: (1) a discretization phase, (2) a parameterization phase, (3) an activity or motion detection phase, and (4) a scripting phase. These four phases are done sequentially, and in this identified order.

In the discretization phase, basic movements are identified. A basic movement is one which cannot be further decomposed, but which can be combined to create larger composite actions, as formulated in Equation (1).

$$Action(A) = \rho f\{Movement(M_i)\} \quad (1)$$

where A is the action;
M is the movement; and
i is the number of movements, from 1 to n.

With this definition, it is only necessary to recognize a small set or number of movements, which span the possibility of asset motions. From these basic movements, any motion of interest (e.g., loading or unloading) can be identified from its multiple movements.

A brief description of the possible movements is presented in Table 1, below, as well as a representative symbol of its movement. The classes of movements include periodic as well as non-periodic movements. For periodic movements, the 'beginning' or 'begin' and 'end' of the movement are defined arbitrarily during execution, in contrast to non-periodic movements, which are described best as a movement event with a clear 'begin' and 'end' point. The 'begin' and 'end' points of the motions are defined by annotating the recorded data in a post-processing step. For periodic movements, the annotation bounds are arbitrarily chosen for each class; for non-periodic movements, the bounds are defined to cover movement onset. Table 1 also shows the time limit of each movement, in order to be recognized as a movement, as well as the force limit (peak) of the movement.

TABLE 1

| Action | Symbol | Remarks | Time Limit | Force Limit |
|---|---|---|---|---|
| UP or DOWN | ↑ or ↓ | Multiple UP or DOWN actions are allowed within a given time bound Intermittent shocks are allowed | $0.1\ s < t_{↑↓} < 2\ s$ | $0.02\ G < F_{↑↓} < 2\ G$ |
| Pallet MOVEMENT | ↑ → ↓ | A trip distance should not exceed a present limit (e.g., 100 m) | $0.1\ s < t_{→} < 10\ s$ | $0.01\ G < F_{→} < 0.5\ G$ |
| TURN | ↵ | A turn, may be skipped as long as qualified UP, MOVE, DOWN actions take place in sequence followed by a TRANSPORTATION action | $0.1\ s < t_{↵} < 2\ s$ | $0.01\ G < F_{↵} < 0.1\ G$ |
| DOCKING |  | DOCKING movement details need further characterization, including exception rules | $0.1\ s < t < 2\ s$ | $0.01\ G < F < 0.1\ G$ |

To determine which movements should be identified, both raw sensor data (i.e., from motion sensor 40) and the asset's kinetics are examined. The movements are simply defined by the number of contained peaks within each movement. While this may not provide a complete basis for the space of asset movement, this decomposition exploits the structure in the data to greatly simplify the recognition of the movement.

In the parameterization phase, the movements identified in the discretization phase are parameterized in terms of magnitude (length) and duration (time), which are descriptive of the asset movement. The recognition is simplified by examining the data streams on an axis-by-axis basis (where the axes are those defined by the body frame of the sensor, e.g., motion sensor 40). Such simplification allows exploitation of the symmetry and allows running the same algorithm repeatedly in a one-dimensional space, which is more efficient than running an algorithm once in a high-dimensional space. This also allows one recognition algorithm can be used with multiple sensors.

In the activity or motion detection phase, sections of increased energy in the motion data are flagged on an axis-by-axis basis for further analysis. For this, the variance of the data over a fixed window is calculated. Because the variance is proportional to $\Sigma(x^2)-(\rho x)^2$, the variance can be calculated very efficiently by maintaining a running sum and a running sum of squares of the data. Ranges where the variance is greater than a set threshold are considered to be periods of activity. The window size and threshold value can be found analytically, based on the sensor noise floor and the minimum attack speed considered to represent a deliberate movement. The threshold should err on the side of false positives, as the motion recognition algorithms will later reject these.

Figure 4:
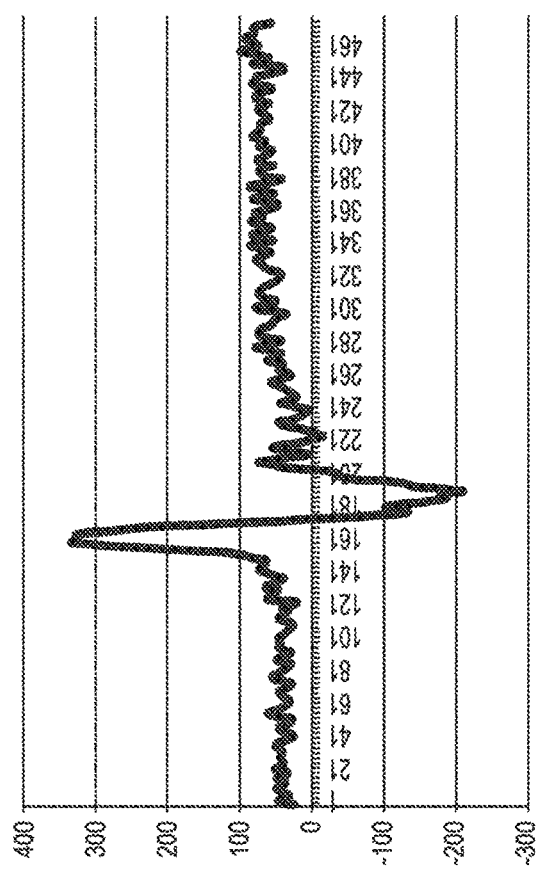
FIG. 4 is a graphical representation of an example of gyroscope motion.

For movement detected by an accelerometer, the velocity of the asset is zero at the ends of the movement (i.e., "begin" and "end"); that is, the asset is stationary at "begin" and at "end". Thus, the integral of the acceleration across it must also be zero (after subtracting any baseline change due to change in orientation). Therefore, recognition of the movement is accomplished by tracking across an area of activity and recording the number of peaks and their integral. A minimum peak size is assumed to reject noise and dithering and smaller peaks are subsumed into the previous peak, if possible. FIG. 4 shows an example of accelerometer motion along the x-axis, where the x-axis shows the count, such as a digital-to-analog converter (DAC) count. If the ratio of the net area under the peaks to the sum of the absolute value of their areas is below a fixed threshold (with random walk noise accounted for even in the ideal case), a valid movement is said to be present. The duration of this valid movement is simply the duration of the area of activity, and its magnitude is proportional to the absolute sum divided by the duration. The parameters are determined after the motion detection phase, which allows it to be done in a single pass, rather than via a multi-step search using expectation-maximization or similar techniques.

Figure 5:
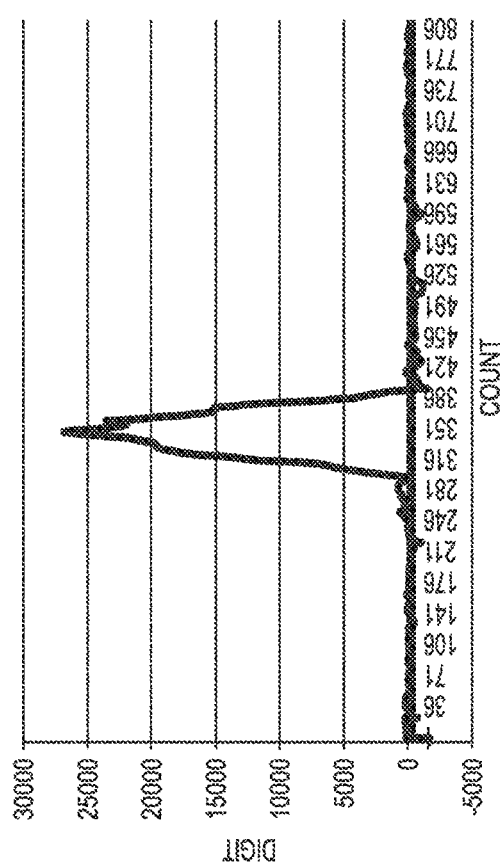
FIG. 5 is a graphical representation of an example of accelerometer motion.

For movements detected by gyroscope, a simple threshold on peak sum is used to distinguish movement from noise. The duration of the movement is the duration of the area of activity and magnitude is proportional to the absolute. FIG. 5 shows an example of the x-axis gyroscope motion, where the x-axis shows the count, e.g., DAC count. To improve recognition rates, the movements are further analyzed to account for two special cases, "broken movements" and "composite movements". "Broken movements" are those made up of two or more areas of activity; these are determined by combining areas of activity (less than a fixed time apart) having no valid movement and reevaluating the combination. "Composite movements" are those where two or more movements are within a single area of activity, and are determined by splitting and reexamining areas of activity at the point where two adjoining peaks whose masses have the same polarity.

In the scripting phase, the movements identified by the previous detection phase can be combined either or both consecutively and concurrently to create an action (e.g., composite movements) of interest as formulated in Equation 1, above. Combinations of individual movements can be restricted to combinations of those with certain parameters. A combination of qualified movement makes a qualified action. Consecutive actions can further be combined to create an event of interest, as formulated in Equation 2, below.

$$\text{Event}(E) = \Sigma f\{\text{Action}(A_j)\} \quad (2)$$

Where E is the event of interest; and
j is the number of actions, from 1 to n.

Figure 6:
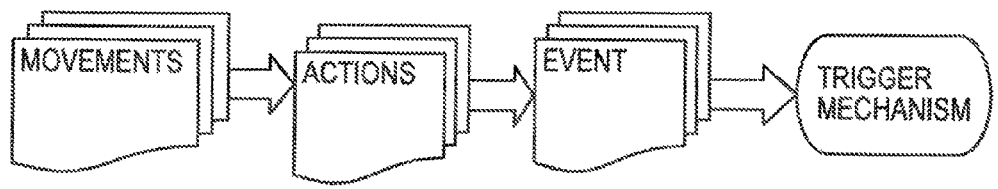
FIG. 6 is a flow chart of detection events.

These actions are then connected to an output event. In accordance with the methodology of this disclosure, and as defined by Equation 2, a combination of qualified actions makes a qualified event. FIG. 6 shows an example flow chart of events.

It is also possible at this stage to analyze additional sensor data of interest (e.g., magnetometer or compass data, altitude data) with appropriate recognition algorithms for that additional data. The output of those algorithms could then be added to the movement found by the above-described activity or motion detection phase and matched and composed in the same fashion.

Events having trigger mechanisms can also be associated with the determined qualified events, as shown in FIG. 6. If a trigger mechanism is to be recognized, the trigger mechanism and its order are recognized, and a simple script is formulated (e.g., written) to recognize that combination of the trigger mechanism and its order.

One example of a trigger mechanism is a "ping" (e.g., communication between tracking device 14 and a remote host or receiver 16). This association is an "event-based ping" (EBP) as formulated in Equation 3. Here, $f(M_i)$, $g(A_j)$, and $h(E_k)$ are not necessarily orthogonal to each other.

Qualified events result in a qualified event-based ping (EBP). A ping that based on an EBP is referred to herein as a "smart ping" (SP), which is one that is based on some action and is not merely time-based. The summation of Movement, Action and Events provides the EBP, which in conjunction with time-based ping methodology($T_i$), provides a smart ping as formulated in Equation 4.

$$\text{Event-Based Ping } (EBP) = \sum f\{Event(E_k)\} \quad (3)$$
$$= \sum \sum \sum \{f(M_i), g(A_j), h(E_k)\}$$

$$\text{Smart Ping } (SP) = \sum \{f(T_i), g(m_j), EBP(E_k)\} \quad (4)$$

Where EBP is the event-based ping,
k is the number of events, from 1 to n,
$T_i$ is the time-based ping, and
$g(m_j)$ is an interdependence factor between time-based ping and event-based ping.

Smart Ping, in general, is methodology based on various motions, movements, triggers such as temperature, altitude, etc. to initiate the transmission of a data ping. Various examples of smart ping technology and methodology are disclosed, for example, in U.S. patent applications having Ser. Nos. 13/796,574 and 13/796,683, both filed Mar. 12, 2013, and U.S. patent application having Ser. No. 13/845, 802 filed Mar. 18, 2013, all assigned to Petari USA, Inc. and all incorporated herein by reference. Equation 4, above, provides a methodology for a smart ping based on a combination of time-based ping methodology and event-based ping methodology. For example, the tracking system (e.g., system 10 of FIG. 1) may be in a time-based ping mode (e.g., having a very long period between pings) until a qualified event is recognized, at which time the data (ping) transmission will switch to an event-based ping mode. In some embodiments, after the event-based ping mode has activated and operated for a predetermined amount of time, the system may return to a (long period) time-based ping. For example, first, second and third long-period pings may be sent when the device is in a time-based ping mode. When a qualified event is recognized, several short period pings may be sent, as per the event-based mode. After a predetermined time period, subsequent pings are time-based until another qualified event. In another embodiment, the tracking system may begin in an event-based ping mode and switch to a time-based mode for a duration of time after a qualified event has been recognized. For example, a first ping is sent when a qualified event is identified by the event-based ping, and subsequent pings are time-based.

By using the methodology of this disclosure, which includes separating the pattern recognition activities of the asset motion into the four phases, the tracking systems of this disclosure produce an active ping based on the occurrence of a predetermined qualified event. By intelligently selecting the occurrence of the pings, the system has an increased value per ping, focusing the pings around events of importance to the asset, and extending battery life. Each ping is more relevant and effective for the systems of this disclosure than for systems that randomly and/or continuously ping.

As will be appreciated by one of skill in the art, the invention of the present disclosure may be embodied as a method of tracking an asset by using a computer program product, a system for tracking an asset that includes a computer program product, or a combination thereof. Accordingly, the invention of the present disclosure may take the form of an entirely hardware embodiment, an entirely software embodiment (including firmware, resident software, micro-code, etc.) or an embodiment combining software and hardware aspects that may generally be referred to herein as a "system." Furthermore, the invention of the present disclosure may take the form of a computer program product on a computer-usable storage medium having computer-usable program code embodied in the medium.

In the context of this disclosure, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wired, optical fiber cable, radio frequency (RF) or other means.

Computer program code for carrying out the various operations of the present disclosure may be written in an object oriented, scripted or unscripted programming language such as Java, Perl, Smalltalk, C++ or the like, or may be written in conventional procedural programming languages, such as the "C" programming language or similar programming languages.

In such a manner, the tracking systems of this disclosure produce an active ping based on a detection and acknowledgement of a qualified event, based on predetermined series of movements. By intelligently selecting the occurrence of the pings based on qualified events, the tracking system has an increased value per ping, focusing the pings around events of importance to the asset, and thus extending battery life. By associating the ping rate with a predetermined business event, each ping is more relevant and effective than for systems which randomly and/or continuously send ping data to the receiver.

Thus, embodiments of the PATTERN RECOGNITION BASED MOTION DETECTION FOR ASSET TRACKING SYSTEM are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of tracking an asset, the method comprising:
transmitting, by a transmitter located with the asset, an initial set of data pings at an initial frequency, wherein a data ping includes data relative to the asset;
detecting a series of movements of the asset, wherein detecting includes using a motion sensor coupled to the transmitter;
creating one or more actions, wherein creating includes combining the series of movements;
correlating the one or more actions to a qualified event, wherein the qualified event is predefined by a unique pattern in the one or more actions; and
transmitting, by the transmitter, a subsequent set of data pings at a subsequent frequency, wherein the subsequent set of data pings are transmitted based on the correlation of the one or more actions to the qualified event, and wherein the subsequent frequency is greater than the initial frequency.

2. The method of claim 1, further comprising:
validating the series of movements as deliberate movements by excluding noise detected by the motion sensor.

3. The method of claim 1, further comprising:
after transmitting the subsequent set of data pings at the subsequent frequency for a time period, transmitting, by the transmitter, an updated set of data pings at the initial frequency.

4. The method of claim 1, wherein detecting the series of movements includes decomposing the data relative to the asset to recognize the series of movements.

5. The method of claim 1, further comprising:
parameterizing the series of movements to identify magnitudes and durations associated with the series of movements.

6. The method of claim 1, wherein the subsequent set of data pings are transmitted wirelessly.

7. The method of claim 6, wherein the transmitter is included in an active radio frequency (RF) tag.

8. The method of claim 1, wherein the initial frequency is predetermined.

9. The method of claim 1, wherein the subsequent set of data pings are transmitted to a receiver located remotely from the transmitter.

10. The method of claim 9, wherein the transmitter is configured to communicate bidirectionally with the receiver.

11. A wireless tracking system comprising:
a motion sensor;
a communication module;
a processor; and
a non-transitory computer-readable medium containing instructions that, when executed by the processor, cause the processor to perform operations including:
transmitting, using the communication module, an initial set of data pings at an initial frequency, wherein a data ping includes data relative to the asset;
detecting a series of movements of the asset, wherein detecting includes using the motion sensor coupled to the communication module;
creating one or more actions, wherein creating includes combining the series of movements;
correlating the one or more actions to a qualified event, wherein the qualified event is predefined by a unique pattern in the one or more actions; and
transmitting, using the communication module, a subsequent set of data pings at a subsequent frequency, wherein the subsequent set of data pings are transmitted based on the correlation of the one or more actions to the qualified event, and wherein the subsequent frequency is greater than the initial frequency.

12. The system of claim 11, wherein the operations further include:
    validating the series of movements as deliberate movements by excluding noise detected by the motion sensor.

13. The system of claim 11, wherein the operations further include:
    after transmitting the subsequent set of data pings at the subsequent frequency for a time period, transmitting, by the transmitter, an updated set of data pings at the initial frequency.

14. The system of claim 11, wherein detecting the series of movements includes decomposing the data relative to the asset to recognize the series of movements.

15. The system of claim 11, wherein the operations further include:
    parameterizing the series of movements to identify magnitudes and durations associated with the series of movements.

16. The system of claim 11, wherein the subsequent set of data pings are transmitted wirelessly.

17. The system of claim 16, wherein the transmitter is included in an active radio frequency (RF) tag.

18. The system of claim 11, wherein the initial frequency is predetermined.

19. The system of claim 11, wherein the subsequent set of data pings are transmitted to a receiver located remotely from the transmitter.

20. The system of claim 19, wherein the transmitter is configured to communicate bidirectionally with the receiver.

* * * * *